(12) United States Patent
Owens

(10) Patent No.: US 12,227,044 B2
(45) Date of Patent: Feb. 18, 2025

(54) VEHICLE WHEEL AND BRAKE DISC APPARATUS

(71) Applicant: Robert Owens, Cave Creek, AZ (US)

(72) Inventor: Robert Owens, Cave Creek, AZ (US)

( * ) Notice: Subject to any disclaimer, the term of this patent is extended or adjusted under 35 U.S.C. 154(b) by 805 days.

(21) Appl. No.: 17/468,245

(22) Filed: Sep. 7, 2021

(65) Prior Publication Data

US 2023/0074048 A1   Mar. 9, 2023

(51) Int. Cl.
| | | |
|---|---|---|
| B60F 1/02 | (2006.01) | |
| B60B 27/00 | (2006.01) | |
| B60L 53/14 | (2019.01) | |
| B60T 1/06 | (2006.01) | |
| F16D 65/12 | (2006.01) | |

(52) U.S. Cl.
CPC ............ B60F 1/02 (2013.01); B60B 27/0052 (2013.01); B60L 53/14 (2019.02); B60T 1/065 (2013.01); F16D 65/123 (2013.01)

(58) Field of Classification Search
CPC ... B60T 1/06; B60T 1/02; B60T 1/065; B60B 27/0052; B60L 53/14; B60F 1/02; B60F 1/00; F16D 65/123
See application file for complete search history.

(56) References Cited

U.S. PATENT DOCUMENTS

| | | | | |
|---|---|---|---|---|
| 1,807,793 | A * | 6/1931 | Moore | B60F 1/02 |
| | | | | 105/72.2 |
| 2,135,307 | A | 11/1938 | Keator | |
| 2,711,800 | A * | 6/1955 | Hagen | F16D 51/08 |
| | | | | 188/18 R |
| 3,434,432 | A | 3/1969 | Seifert | |
| 6,324,994 | B1 | 12/2001 | Glenn | |
| 7,077,065 | B2 * | 7/2006 | Tremblay | B60B 19/02 |
| | | | | 105/72.2 |
| 7,975,618 | B2 | 7/2011 | Bullis | |
| 8,220,568 | B2 | 7/2012 | Stoicoviciu | |
| 8,499,910 | B2 | 8/2013 | Hubner | |
| 10,106,132 | B2 * | 10/2018 | Takeo | B60T 13/74 |
| 10,569,764 | B2 | 2/2020 | Skokan | |
| 10,837,509 | B2 * | 11/2020 | Sabeti | F16D 65/123 |
| 2005/0225105 | A1 | 10/2005 | Meyer | |
| 2017/0110933 | A1 * | 4/2017 | Michel | H02K 5/203 |

FOREIGN PATENT DOCUMENTS

| | | | | | |
|---|---|---|---|---|---|
| CN | 109572388 | A * | 4/2019 | | |
| CN | 112572374 | A * | 3/2021 | ............. | B60C 23/10 |
| FR | 2700591 | A1 * | 7/1994 | ......... | B60B 27/0026 |

* cited by examiner

Primary Examiner — Zachary L Kuhfuss
Assistant Examiner — Cheng Lin
(74) Attorney, Agent, or Firm — Parsons & Goltry, PLLC; Michael W. Goltry; Robert A. Parsons

(57) ABSTRACT

A wheel and brake disc apparatus of a vehicle includes a roadway wheel and a brake disc mounted rotatably to the vehicle, the roadway wheel and the brake disc arranged about an axis of rotation. The roadway wheel extends radially in relation to the axis of rotation to a wheel rim configured to hold a tire adapted to operate on a roadway surface. The brake disc is inboard of the roadway wheel and extends radially in relation to the axis of rotation to a brake disc rim. A brake caliper assembly mounted at a fixed location over the brake disc rim is configured to squeeze brake pads against the brake disc. The brake disc rim includes a tread configured to operate on a rail without interference from the brake caliper assembly.

25 Claims, 14 Drawing Sheets

VEHICLE WHEEL AND BRAKE DISC APPARATUS

FIELD OF THE INVENTION

The present invention generally relates to motor vehicles and, more particularly, to motor vehicles adapted for operation on a roadway surface and rails.

BACKGROUND OF THE INVENTION

A standard motor vehicle used to transport people or cargo includes a body supported on a wheeled chassis, including rear wheels and steerable front wheels. The chassis supports the engine that drives at least one of the rear wheels and the front wheels. The engine is typically an internal combustion engine, an electric motor, or a combination thereof. At least one electric motor powered by the chargeable batteries of a traction battery system drives an electric motor vehicle. An internal combustion engine and at least one electric motor powered by the chargeable batteries of a traction battery system drive a hybrid motor vehicle. Due to an urgent focus on renewable energy and the potential reduction of transportation's impact on climate change and other environmental issues, electric and hybrid vehicles are now commonplace.

Standard motor vehicle wheels incorporate disc brakes. A disc brake uses a caliper assembly to squeeze brake pads against a brake disc or rotor to create friction for slowing and stopping the moving vehicle. A standard disc brake for a motor vehicle includes a disc, a master cylinder, and a caliper assembly including a fixture that supports pistons and brake pads. The master cylinder, a control device that converts force, commonly from a driver's foot, to hydraulic pressure, controls the pistons that operate the brake pads on either side of the disc. Standard vehicle brake discs are robust, single-purpose components configured solely to interface with the brake pads. In view of the present proliferation of electric and hybrid vehicles, there is a need in the art to improve brake discs or rotors to enable a vehicle to operate on rails and interface with electric vehicle supply equipment to supply electric energy to charge the batteries that power the electric motor(s) of electric and hybrid vehicles.

SUMMARY OF THE INVENTION

According to the invention, a wheel and brake disc apparatus of a vehicle includes a roadway wheel and a brake disc mounted rotatably to the vehicle, the roadway wheel and the brake disc arranged about an axis of rotation. The roadway wheel extends radially in relation to the axis of rotation to a wheel rim configured to hold a tire adapted to operate on a roadway surface. The brake disc is inboard of the roadway wheel and extends radially in relation to the axis of rotation to a brake disc rim. A brake caliper assembly mounted at a fixed location over the brake disc rim is configured to squeeze brake pads against the brake disc. The brake disc rim includes a tread configured operate on a rail without interference from the brake caliper assembly. A first radius extends from the axis of rotation to the wheel rim, a second radius extends from the axis of rotation to the brake disc rim, and the first radius is greater than the second radius. The brake caliper assembly extends outward beyond the first radius from the brake disc rim. A knuckle is mounted at a fixed position adjacent to the brake disc, and the brake caliper assembly is mounted to the knuckle. The rail is electrically conductive. The tread includes an electrically conductive track configured to contact and electrically connect to the rail, including when the roadway wheel and the brake disc concurrently rotate about the axis of rotation. The brake disc includes an insulator configured to electrically isolate the electrically conductive track from the brake disc. The brake disc rim additionally includes a flange on either side of the electrically conductive track. A contact mounted at a fixed position is electrically connected to an electric power system of the vehicle and in electrical contact against the electrically conductive track, including when the roadway wheel and the brake disc concurrently rotate about the axis of rotation. The vehicle is an electric or hybrid electric vehicle powered by chargeable traction batteries of a traction battery system, and the electric power system is the traction battery system. The contact is carried by the caliper assembly. In another embodiment, the contact is a roller configured to rotate against, and in response to rotation of, the brake disc. The roller is mounted rotatably to the brake caliper assembly in an exemplary embodiment.

According to the invention, a wheel and brake disc apparatus of a vehicle includes a roadway wheel and a brake disc secured to a hub of an axle of the vehicle, the roadway wheel and the brake disc arranged about an axis of rotation of the hub. The roadway wheel extends radially in relation to the axis of rotation to a wheel rim configured to hold a tire adapted to operate on a roadway surface. The brake disc is inboard of the roadway wheel and extends radially in relation to the axis of rotation to a disc rim from an open end of a hat extending outward from the brake disc to an assembly of an inwardly-directed flange secured to the hub. The hat defines a volume between the open end and the assembly, and the axle extends through the volume to the hub from the open end. A radial rotary bearing in the volume is coupled between the axle and the hat and is configured to support radial loads therebetween. A brake caliper assembly mounted at a fixed location over the brake disc rim is configured to squeeze brake pads against the brake disc. The brake disc rim includes a tread configured operate on a rail without interference from the brake caliper assembly. Circumferentially spaced apart gussets are coupled between the hat and the rotor for reinforcement purposes. A first radius extends from the axis of rotation to the wheel rim, a second radius extends from the axis of rotation to the brake disc rim, and the first radius is greater than the second radius. The brake caliper assembly extends outward beyond the first radius from the brake disc rim. A knuckle is mounted at a fixed position adjacent to the brake disc, and the brake caliper assembly is mounted to the knuckle. The rail is electrically conductive. The tread includes an electrically conductive track configured to contact and electrically connect to the rail, including when the roadway wheel, the brake disc, and the hub concurrently rotate about the axis of rotation. The brake disc includes an insulator configured to electrically isolate the electrically conductive track from the brake disc. The brake disc rim additionally includes a flange on either side of the electrically conductive track. A contact mounted at a fixed position is electrically connected to an electric power system of the vehicle and in electrical contact against the electrically conductive track, including when the roadway wheel and the brake disc concurrently rotate about the axis of rotation. The vehicle is an electric or hybrid electric vehicle powered by chargeable batteries of a traction battery system, and the electric power system is the traction battery system. The contact is carried by the caliper assembly. In another embodiment, the contact is a roller configured to rotate against, and in response to rotation of, the brake disc. The roller is mounted rotatably to the brake caliper assembly in an exemplary embodiment.

BRIEF DESCRIPTION OF THE DRAWINGS

Specific objects and advantages of the invention will become readily apparent to those skilled in the art from the following detailed description of illustrative embodiments thereof, taken in conjunction with the drawings in which.

DETAILED DESCRIPTION

Disclosed is a motor vehicle having wheels adapted for operation of the vehicle on a roadway surface and disc brake assemblies including brake rotors having brake discs configured for operation of the vehicle on rails.

Figure 1:
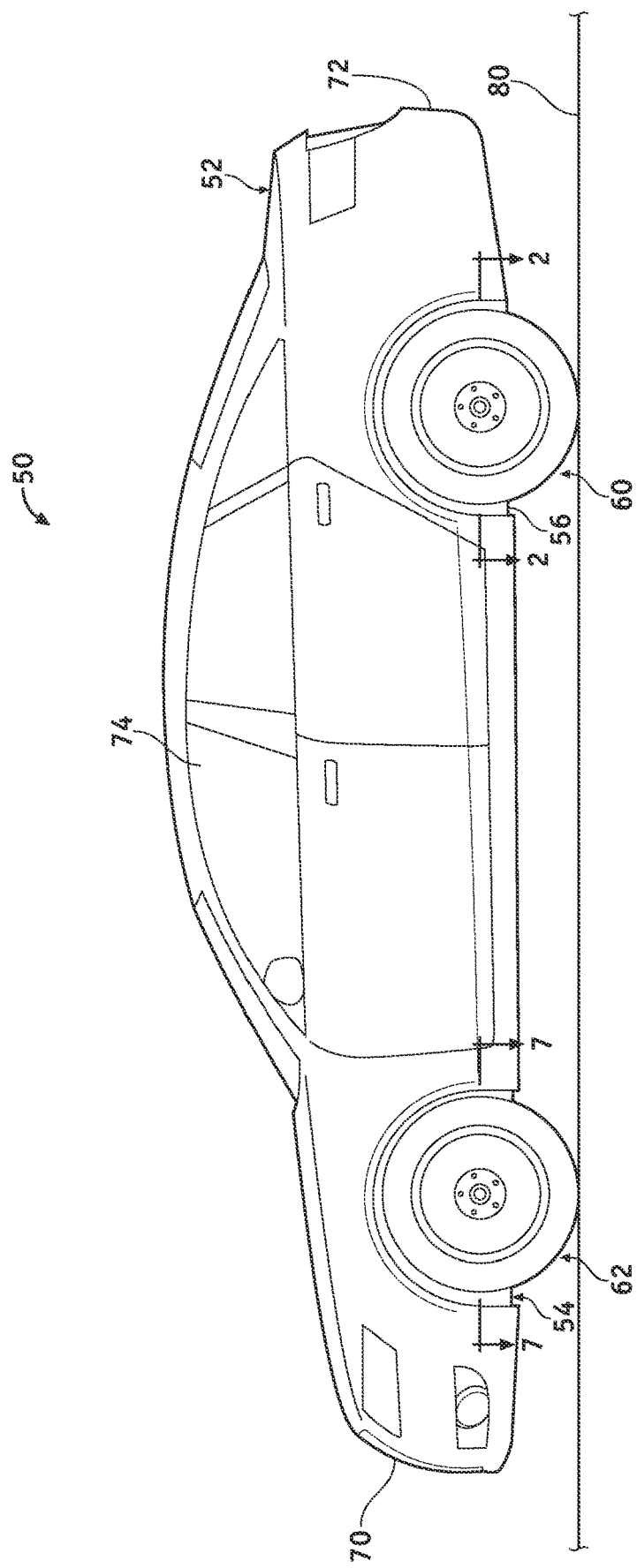
FIG. 1 is a left side elevation view of a motor vehicle embodying features of the invention, the opposite right side elevation being substantially the same thereof.

FIG. 1 is a left side elevation view of a self-propelled motor vehicle 50 embodying features of the invention, with the opposite right side elevation view being substantially the same thereof. Vehicle 50 includes a body 52 supported by a chassis 54 including a standard frame 56, two rear wheels 60, two steerable front wheels 62, and a standard engine, transmission, and drive train that drives one or more of wheels 60 and 62 for propulsion of vehicle 50, in this example rear wheels 60. Body 52 has a forward end 70, a rearward end 72, and a compartment 74 for passengers and materials. Compartment 74 is between rear wheels 60 and front wheels 62 at the middle of body 52 between forward and rearward ends 70 and 72. In compartment 74 are driver and passenger seats and the conventional controls associated with the operation of vehicle 50, such as a steering wheel for steering front wheels 62, throttle and brake pedals, etc. The vehicle's 50 engine includes at least one standard electric motor powered by the electric power system of vehicle 50, including chargeable traction batteries 84 of vehicle's 50 standard traction battery system 86 in FIG. 9. Accordingly, vehicle 50 exemplifies an electric vehicle or a hybrid motor vehicle in an embodiment of vehicle 50 with an internal combustion engine that works in concert with at least one electric motor. Wheels 60 and 62 are roadway wheels adapted for the routine operation of vehicle 50 on a roadway surface 80 and associate with disc brake assemblies configured to slow and stop the moving vehicle 50 and for the operation of vehicle 50 on rails in FIGS. 10 and 11 according to the invention. Rear wheels 60 and their associated disc brake assemblies are identical, and front wheels 62 and their associated disc brake assemblies are identical. Accordingly, below is a detailed discussion of the left rear wheel 60 and its associated disc brake assembly, followed by a brief discussion of the left front wheel 62 and its associated disc brake assembly. The description of the left rear wheel 60 and its associated disc brake assembly applies in every respect to the vehicle's 50 right rear wheel and its associated disc brake assembly and the description of the left front wheel 62 and its associated disc brake assembly applies in every respect to vehicle's 50 right front wheel and its associated disc brake assembly.

Figure 2:
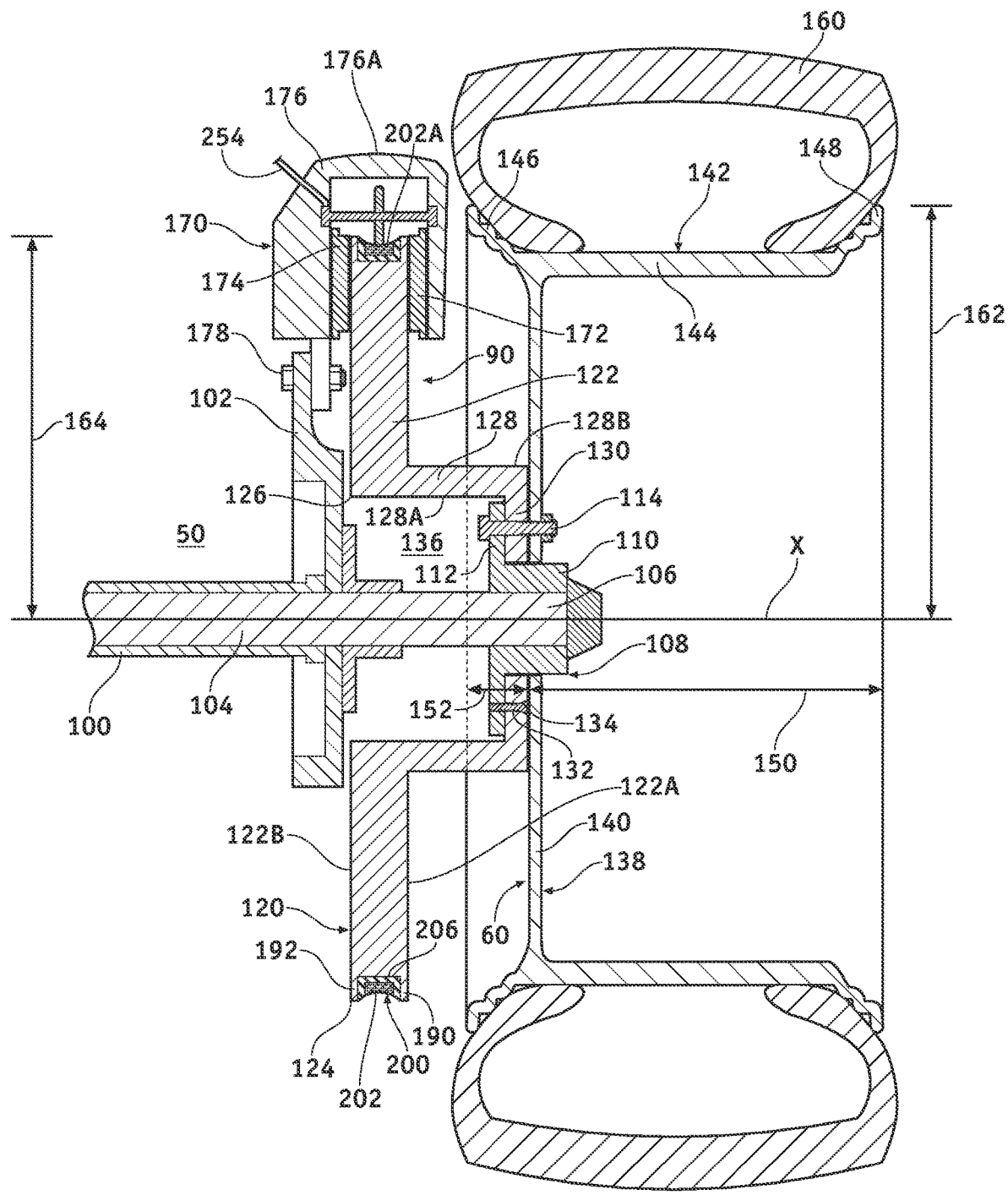
FIG. 2 is a section view along line 2-2 of FIG. 1.

In FIG. 2, a section view of the left rear wheel 60 and its associated disc brake assembly 90 along line 2-2 of FIG. 1, the vehicle's 50 axle housing 100 fixed to a knuckle 102 supports a rear drive axle 104 configured to be driven for rotation by the vehicle's 50 engine. Axle 104 extends through knuckle 102 from axle housing 100 to the axle's 104 end portion 106 configured with a standard hub 108 securing wheel 60 and brake rotor 120 of vehicle's disc brake assembly 90 for concurrent rotation with drive axle 104 about the axle's 104 axis X of rotation. Wheel 60 and brake rotor 120 are coaxially mounted to axle's 104 hub 108 for rotation about axle's 104 axis X of rotation. Hub 108 is of standard construction and includes a central section 110 extending outward from a hub flange 112 configured with integrated stud bolts 114. Brake rotor 120 and rear wheel 60 have registering openings for the receipt of stud bolts 114 to secure brake rotor 120 and rear wheel 60 together and to hub 108.

Referring in relevant part to FIGS. 2-5, for mounting brake rotor 120 and rear wheel 60 on hub 108, brake rotor 120, a stout fixture fashioned of iron or steel, includes a brake disc 122, including inner and outer braking surfaces 122A and 122B, extending radially outward in relation to axis X to a disc rim 124 from an open end 126 of a hat 128. Disc rim 124 is the annular, peripheral extremity of brake disc 122. Hat 128, the central section of brake rotor 120, extends axially outward from brake disc 122 to hat's 128 offset rotor flange 130 secured to hub 108. Rotor flange 130 extends radially inward over and against the outer side of hub flange 112 to hub's 108 central section 110. Rotor flange 130 circumscribes central section 110. Bolts 132, the heads of which are recessed within counterbores 134, extend through rotor flange 130 and threadably engage hub flange 112 to form a rigid unit of brake rotor 120 and hub 108. In FIG. 2, hat 128 is hollow continuous sidewall including an inner surface 128A and an outer surface 128B. Inner surface 128A and outer surface 128B extend from open end 126 and outer braking surface 122B, respectively, to hat's offset rotor flange 130. Inner surface 128A defines hat's 128 volume 136 between its open end 126 and the assembly of hub 108 and the brake rotor's 120 rotor flange 130. Axle 104 extends centrally through volume 136 to hub 108 from knuckle 102 and hat's 128 open end 126.

In FIGS. 1 and 2, rear wheel 60, a frame 138 of metal or other standard material or combination of materials, includes a wheel web 140 configured with a wheel rim 142 adapted to accept a standard pneumatic tire in a usual manner. In FIG. 2, the mounting face of web 140 on its inner side extends over and against the outer side of rotor flange 130 to hub's 108 central section 110. Web 140 circumscribes central section 110 and extends radially outward from central section 110 in relation to axis X to rim 142. Brake rotor 120 and web 140 of rear wheel 60 have registering openings for receiving stud bolts 114 to secure brake rotor 120 and rear wheel 60 together and to hub 108 to form a rigid unit of brake rotor 120, hub 108, and rear wheel 60. Rim 142 includes cylindrical portion or drum 144 extending axially outward from an inner flange 146 to an outer flange 148. A standard pneumatic tire 160 detachably mounted to wheel rim 142 between flanges 146 and 148 provides a complete wheel 60 in FIGS. 2 and 3 for standard operation on a roadway surface. In FIG. 2, wheel 60 is a reverse offset wheel, having a deep front space 150 from the outside edge of wheel 60 to its mounting face against the outer side of rotor flange 130, and a comparatively shallow backspace 152 from the inside edge of wheel 60 to its mounting face against the outer side of rotor flange 130.

Figure 3:
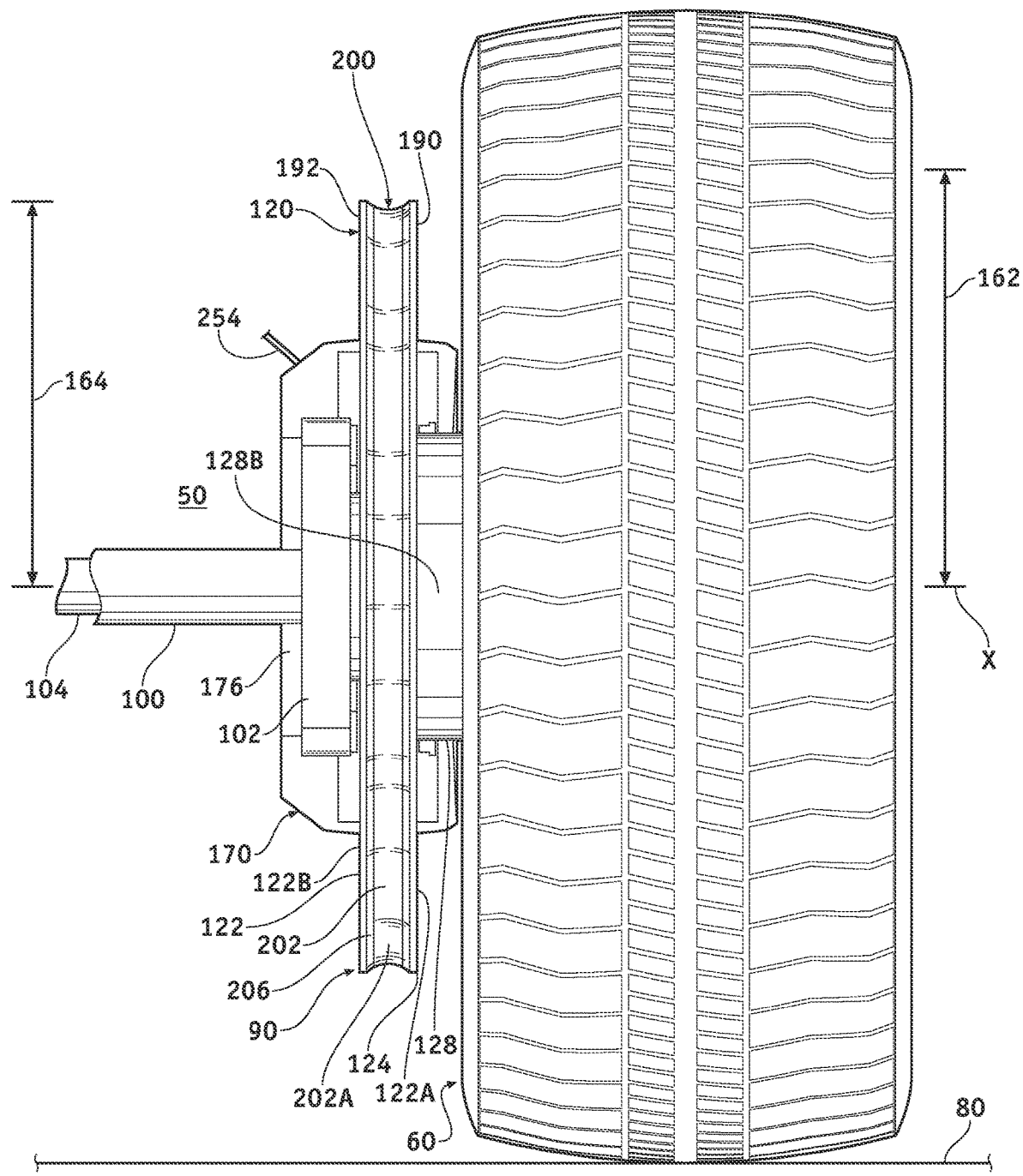
FIG. 3 is a leading elevation view of a left rear wheel and disc brake assembly of the embodiment of FIG. 1.
Figure 4:
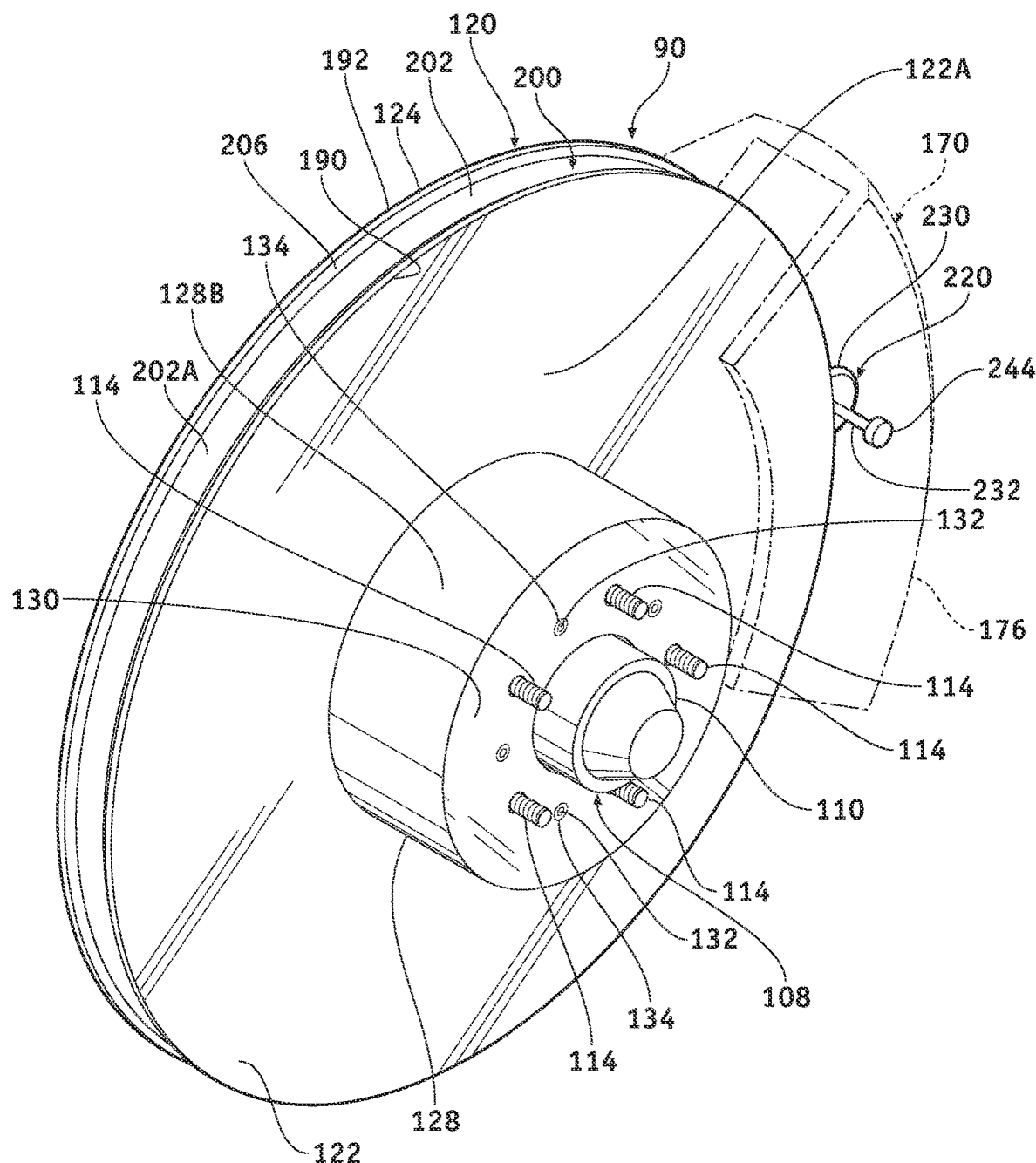
FIG. 4 is an outer side perspective view of a brake rotor and a brake caliper assembly of the embodiment of FIG. 2, the brake caliper assembly highly generalized and partly in phantom line for illustrative purposes.
Figure 5:
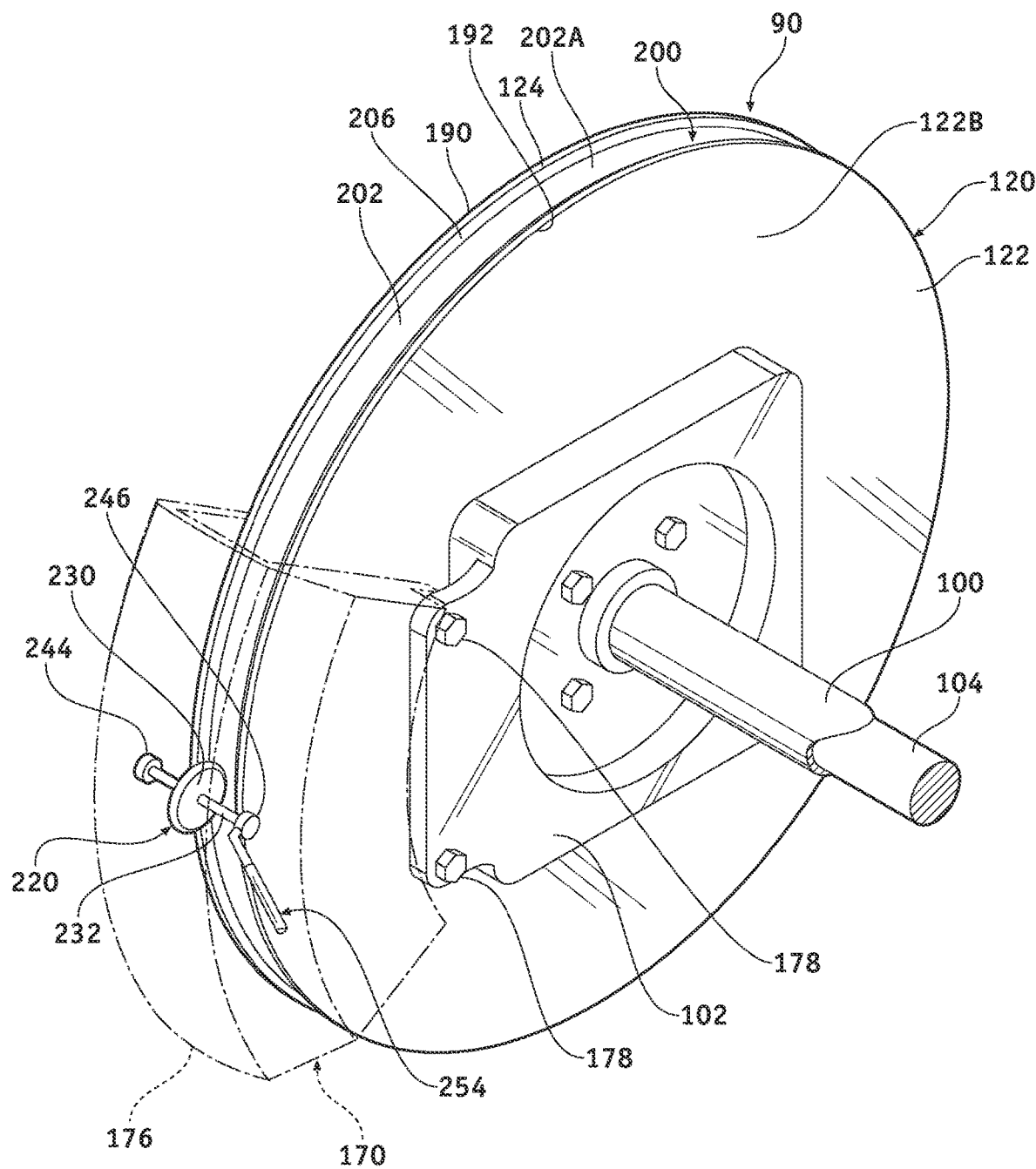
FIG. 5 is an inner side perspective view of the embodiment of FIG. 4.

Referring in relevant part to FIGS. 2 and 3, hat 128 extends axially inward from its rotor flange 130 secured against the outer side of hub flange 112 and the inner side of web 140 to open end 126 and brake disc 122 spaced or otherwise offset inboard from rear wheel 60. Brake disc 122 inboard and out of the way of rear wheel 60 is between rear wheel 60 and knuckle 102 and extends radially outward in relation to axis X of rotation to disc rim 124 from hat's 128 open end 126. A constant radius 162 extends from axis X of rotation to wheel rim 142, and a constant radius 164 extends from axis X of rotation to brake disc rim 124. Radius 162 is greater than radius 164. Accordingly, the diameter of rear wheel 60 about axis X of rotation is greater than the diameter of brake disc 122. This disables disc rim 124 from contacting roadway surface 80 and becoming damaged when rim 142 is configured with tire 160 and its inflated for normal operation, when rim 142 is configured with tire 160 and its flat, and when rim 142 is not configured with tire 160. Brake disc 122 and its associated wheel 60 form a wheel and brake disc apparatus according to the invention.

Figure 6:
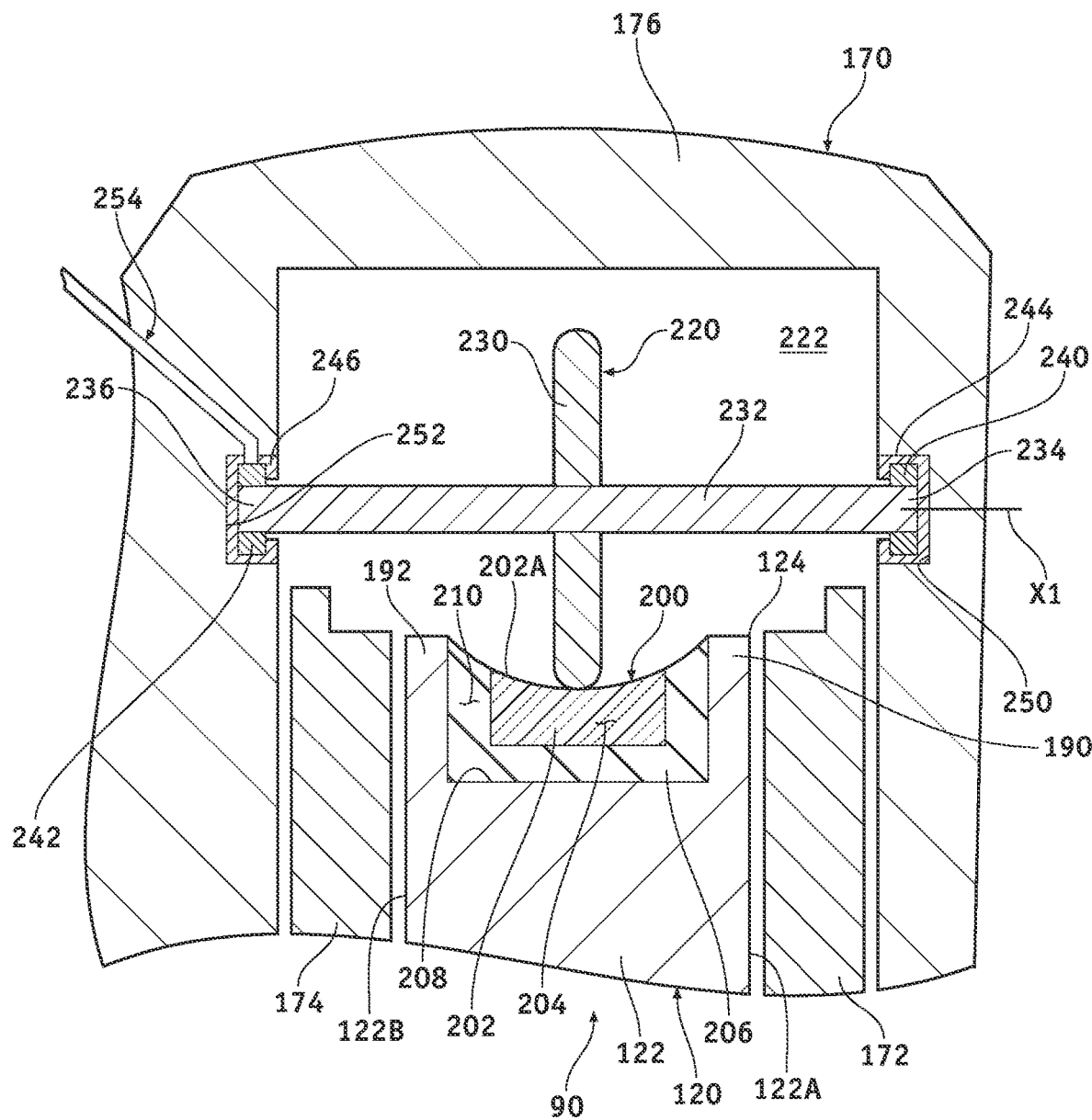
FIG. 6 is an enlarged, fragmentary view corresponding to FIG. 2.

In FIG. 2-5, disc brake assembly 90 further includes a brake caliper assembly 170 mounted at a fixed location over disc rim 124 inboard and out of the way of wheel 60. In FIGS. 2 and 6, brake caliper assembly 170 is configured to squeeze its brake pads 172 and 174 against brake disc's 122 inner and outer braking surfaces 122A and 122B to create friction for slowing and stopping the moving vehicle 50. Brake caliper assembly 170 includes a stout, rugged fixture 176 of cast iron or steel mounted at a fixed location over disc rim 124. Except for its improvements described below, fixture 176 is of standard construction. It supports the conventional brake pads 172 and 174 on either side of brake disc 122 in a normal manner, brake pad 172 alongside inner braking surface 122A and brake pad 174 alongside outer braking surface 122B. Fixture 176 supports standard pistons (not shown) operatively coupled to a standard master cylinder (not shown). The master cylinder, a control device that converts force from a driver's foot activating and deactivating vehicle's 50 brake pedal in compartment 74 to hydraulic pressure, controls fixture's 176 pistons that operate inner and outer brake pads 172 and 174 on brake disc's 122 respective inner and outer braking surfaces 122A and 122B. In this embodiment, bolts 178 secure fixture 176 at its fixed location to knuckle 102 in FIGS. 2 and 3 at a standard elevated location in FIG. 3 along the trailing side brake disc 122 opposing and to the rear of knuckle 102 and axis X of rotation preventing brake caliper assembly 170 from interfering with wheel 60 operating on roadway surface 80 according to standard practice and brake disc assembly 90 operating on a rail. In FIG. 2, brake caliper assembly 70 positioned over brake disc rim 124 extends outward beyond radius 152 from brake disc rim 124.

In FIGS. 2-6, brake disc rim 12 includes inner and outer rail flanges 190 and 192 on either side of a central tread 200 profiled to operate on a rail without interference from wheel 60 and brake caliper assembly 170. Tread 200, a peripheral tread of brake disc 122, is continuous and follows disc rim 124. Tread 200 includes a track 202 that fills a central confining volume 204 defined by a U-shaped insulator 206 secured in and lining a U-shaped groove 208 formed centrally in disc rim 124 between inner and outer flanges 190 and 192. Groove 208 defines a confining volume 210 filled by track 202 and insulator 206. Insulator's 206 confining volume 204 is part of groove's 208 confining volume 210. Track 202 is electrically conductive, formed of steel or cast iron in this embodiment. Insulator 206, a liner secured between track 202 and brake disc 122, is electrically nonconductive, formed, for example, of ceramic, plastic, or a rugged elastomer. A suitable temperature-, moisture-, and lubricant-resistant adhesive or epoxy aggressively adheres insulator 206 to groove 208 and track 202 to insulator 206. Insulator 206 serves to electrically isolate track 202 from brake rotor 120, including brake disc 122. Track 204 extends radially outward through confining volume 204 to an exposed inwardly-curved contact surface 202A centered between inner and outer flanges 190 and 192 and configured to contact and operate on a rail. Brake disc 122 interfaces with brake pads 172 and 174 and serves as a railway wheel.

Figure 9:
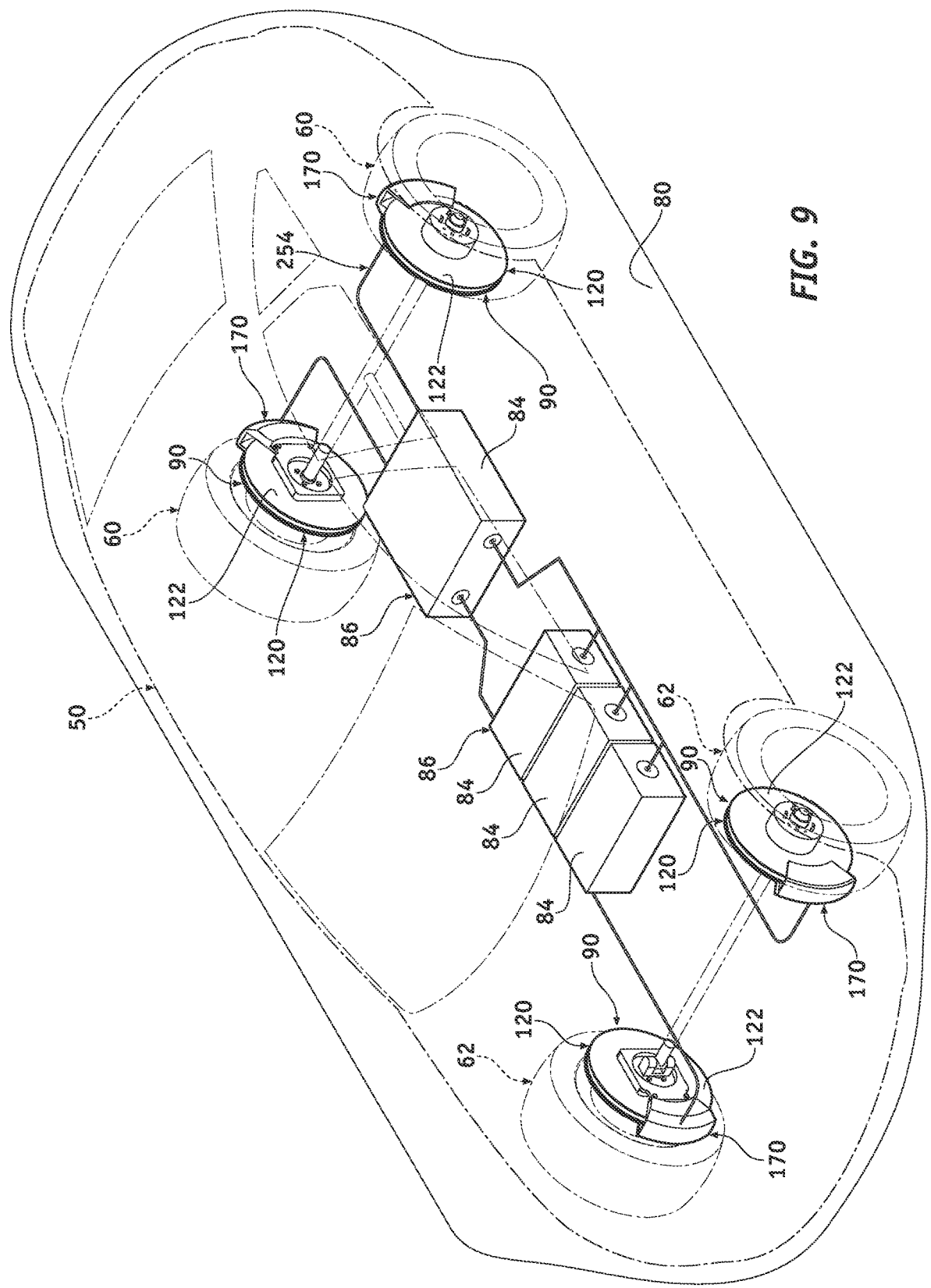
FIG. 9 is a highly generalized schematic representation of the embodiment of FIG. 1.

Track 202 is electrically connected to the vehicle's 50 electric power system, including chargeable traction batteries 84 of traction battery system 86 in FIG. 9, for charging the vehicle's batteries 84 when track 202 is energized electrically. Insulator 206 electrically insulating track 202 from brake rotor 120 disables brake rotor 120 from becoming energized by track 202. In FIG. 6, contact 220 electrically connected between track 202 and vehicle's 50 electric power system electrically connects track 202 to vehicle's 50 electric power system, including when wheel 60 and brake rotor 120 concurrently rotate about axle's 104 axis X of rotation.

In FIG. 6, contact 220 mounted at a fixed position adjacent to track 202 is in electrical contact directly against track's 202 contact surface 202A, including when wheel 60 and brake disc 122 of brake rotor 120 concurrently rotate about axle's 104 axis X of rotation in FIG. 2. Contact 220 is part disc brake assembly 90. Fixture 176 carries contact 220. Fixture 176 defines a volume or compartment 222 over disc rim 124 housing contact 220. Contact 220 housed in compartment 222 between fixture 176 and track 202 is a roller 230 fixed centrally to an axle or shaft 232 forming a rigid unit. Roller 230 and shaft 232 are electrically conductive, formed of steel, cast iron, or other conductive metal. Shaft 232 extends through compartment 136 and extends outwardly from either side of roller 230 to free ends 234 and 236 journaled for rotation to standard rotary bearings 240 and 242 carried by collars 244 and 246 press-fit in respective recesses 244 and 246 open to compartment 136 in either side of fixture 176. Rotary bearings 240 and 242 are electrically conductive, formed of steel or other conductive metal, and electrically connect to shaft 232. Collars 244 and 246 are electrically non-conductive, formed of ceramic, a rugged, resilient plastic or elastomer, or the like. Collars 244 and 246 electrically isolate from fixture 176 rotary bearings 240 and 242 and shaft 232 and its attached contact 220 electrically connected to tread 202 electrically isolated from brake rotor 120 that supports tread 202. Roller 230, the preferred contact in this embodiment, centered between ends 234 and 236 is in constant electrical rolling contact directly against contact surface 202A of track 202. Shaft 232 and roller 230 concurrently rotate about shaft's 232 axis X1 of rotation in response to rotation of brake rotor 120. Accordingly, rotation of brake rotor 120 imparts corresponding rotation of shaft 232 and its attached roller 230 in constant rolling contact against track's 202 contact surface 202A about shaft's 232 axis X1 of rotation. The insulated electrical wiring 254 of the vehicle's 50 electric power system extends through fixture 176 and electrically connects to rotary bearing 242 electrically connected to shaft 232 and shaft's 232 attached roller 230 electrically connected to brake disc's 120 track 202 to chargeable traction batteries 84 of the traction battery system 86 in FIG. 9. The vehicle's 50 right rear wheel and associated disc brake assembly are identical to the vehicle's left rear wheel 60 and associated disc brake assembly 90.

Figure 7:
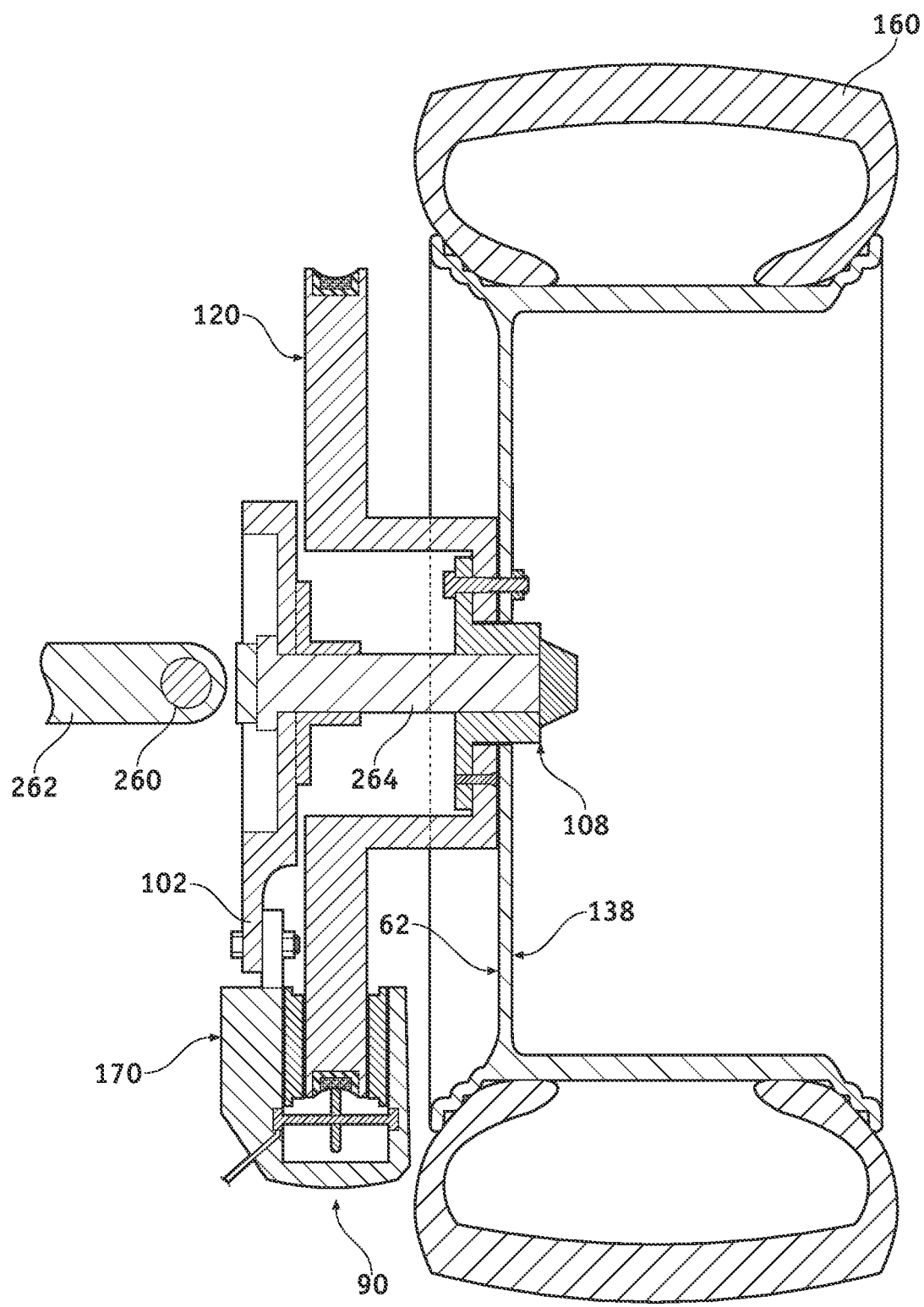
FIG. 7 is a section view along line 7-7 of FIG. 1.
Figure 8:
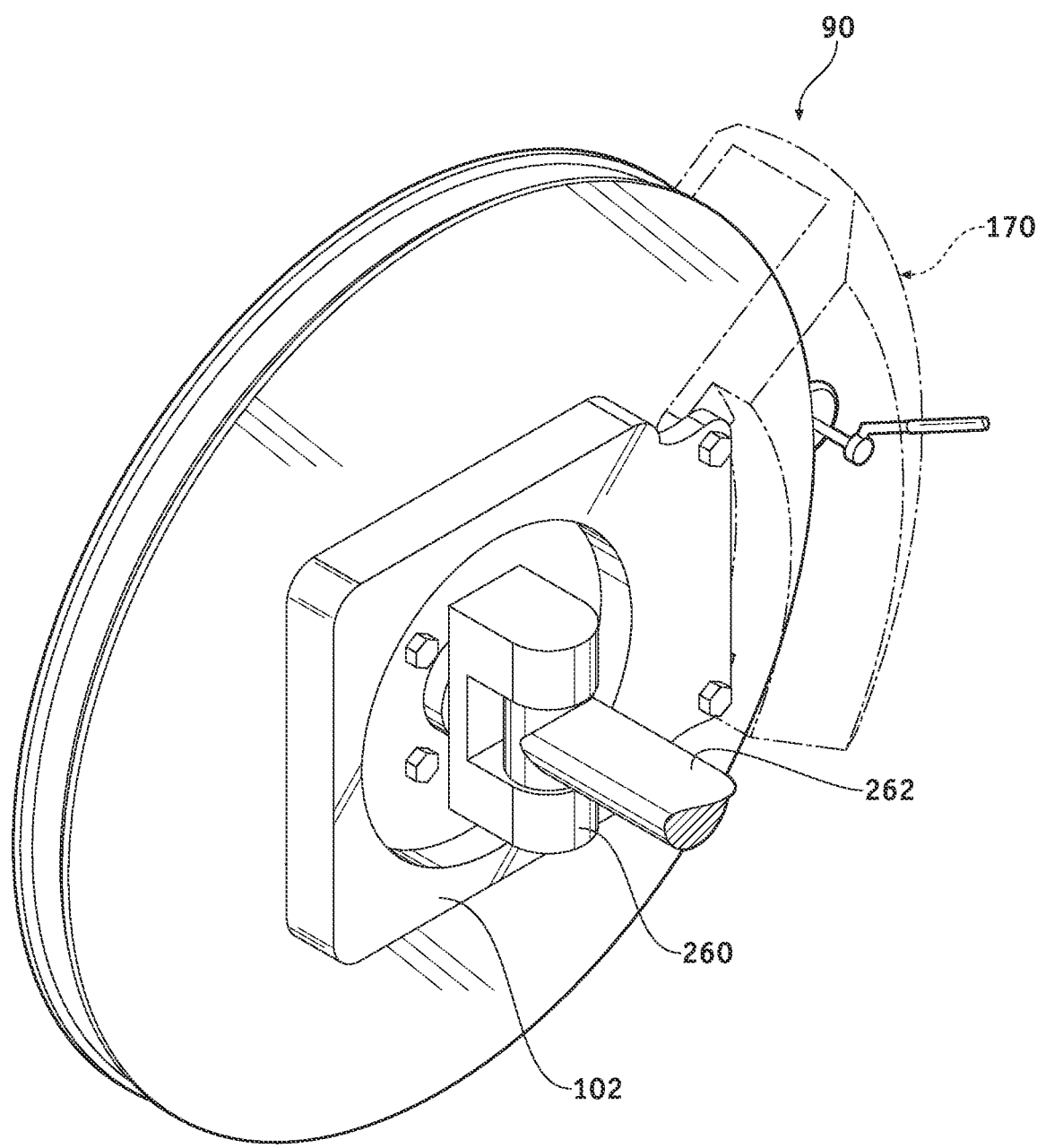
FIG. 8 is an inner side perspective view of a brake rotor and a brake caliper assembly of the embodiment of FIG. 7, the brake caliper assembly highly generalized and in phantom line for illustrative purposes.

Referring to FIG. 7, a section view of the left front wheel 62 along line 7-7 of FIG. 1, in common with left rear wheel 60, steerable left front wheel 62 shares disc brake assembly 90 including brake rotor 120 and brake caliper assembly 170, knuckle 102, hub 108, frame 138, tire 160, and their various appurtenances described in detail above. In this embodiment, the brake caliper assembly 170 fixture 176 is secured at its fixed location to knuckle 102 at a standard elevated location along the leading side brake disc 122 opposing and to the front of knuckle 102 preventing brake caliper assembly 170 from interfering with wheel 62 operating on a roadway surface according to standard practice and brake disc assembly 90 from operating on a rail. Left front wheel 62 is steerable by a standard steering joint 260 coupling the vehicle's 50 left-side strut 260 to the vehicle's 50 front, left stub axle 264 rotated to knuckle 102. Axle 264 extends through knuckle 102 to the rigid unit of hub 108, brake rotor 120, and frame 138 of the vehicle's 50 rear wheel 62. Other than the described minor differences, the details of left rear wheel 60 apply in every respect to the vehicle's 50 left front wheel 62. The vehicle's 50 right front wheel and associated disc brake assembly are identical to the vehicle's 50 left front wheel 62 and associated disc brake assembly 90.

Figure 10:
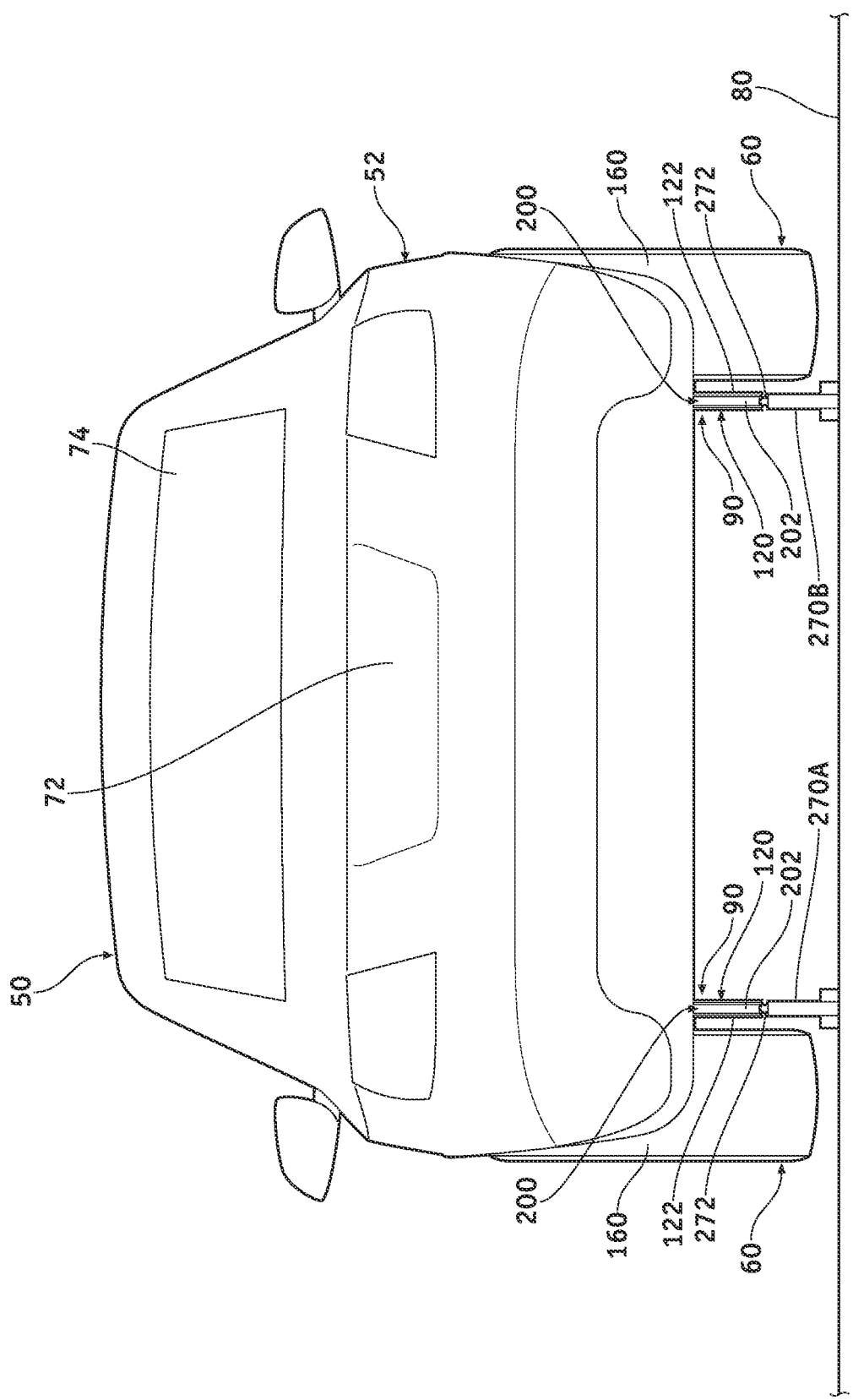
FIG. 10 is a rear elevation view of the embodiment of FIG. 1 operating on rails.
Figure 11:
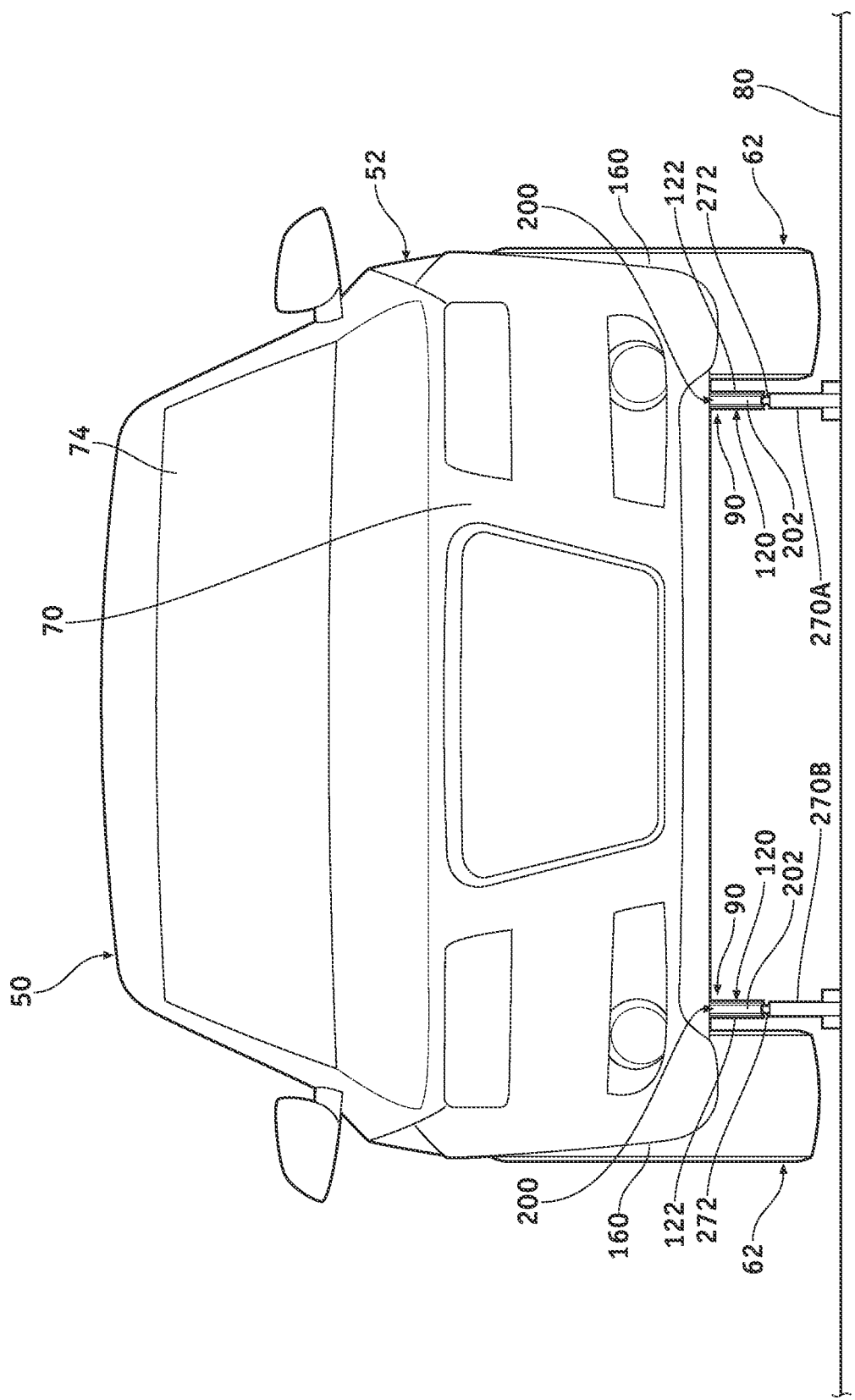
FIG. 11 is a front elevation view of the embodiment of FIG. 10.

Wheels 60 and 62 and their associated disc brake assemblies 90 enable vehicle 50 to operate on roadway surface 80 in FIG. 1 by wheels 60 and 62 and parallel rails 270A and 270B in FIGS. 10 and 11 by the brake rotor's 120 brake discs 122. In FIG. 1, tires 160 of rear and front wheels 60 and 62 operate on roadway surface 80 in the normal roadway operation of vehicle 50. Rails 270A and 270B are identical and each extend upright from roadway surface 80 to a head 272. When tires 160 of wheels 60 and 62 are operating on roadway surface 80, brake discs 122 do not engage roadway surface 80 as illustrated by left rear wheel 60 and its associated disc brake assembly 90 in FIG. 3. Batteries 84 of traction battery system 86 power vehicle's 50 electric motor(s) (not shown) for propelling vehicle 50 over roadway surface 80 under the control of vehicle's 50 driver. When brake discs 122 are mounted on and supported by heads 272 of rails 270A and 270B in FIGS. 10 and 11, brake discs 122 of the left rear and front wheels 60 and 62 operating on head 272 of rail 270A and brake discs 122 of the right rear and front wheels 60 and 62 operating on head 272 of rail 270B, the left rear and front wheels 60 and 62 are outboard and clear of rail 270A and their tires 160 are elevated over roadway surface 80 and the right rear and front wheels 60 and 62 are outboard and clear of rail 270B and their tires 160 are elevated over roadway surface 80. When brake discs 122 are mounted on and supported by heads 272 of rails 270A and 270B in FIGS. 10 and 11, tires 160 are out of contact against roadway surface 80 and the brake rotors 120 the support vehicle's 50 weight enabling vehicle 50 operate on rails 270A and 270B without interference or drag between tires 160 and roadway surface 80. Batteries 84 of traction battery system 86 power vehicle's 50 electric motor(s) (not shown) for propelling vehicle 50 over rails 270A and 270B under the control of vehicle's 50 driver. With the aid of suitable ramps adjacent to tracks 270A and 270B at track access and discharge points, vehicle 50 may readily drive onto tracks 270A and 270B from roadway surface 80 and vice versa. In FIGS. 10 and 11, vehicle's 50 body 52 conceals from view the elevated brake caliper assemblies 170 associated with the respective brake rotors 120 depicted in FIG. 9.

Figure 12:
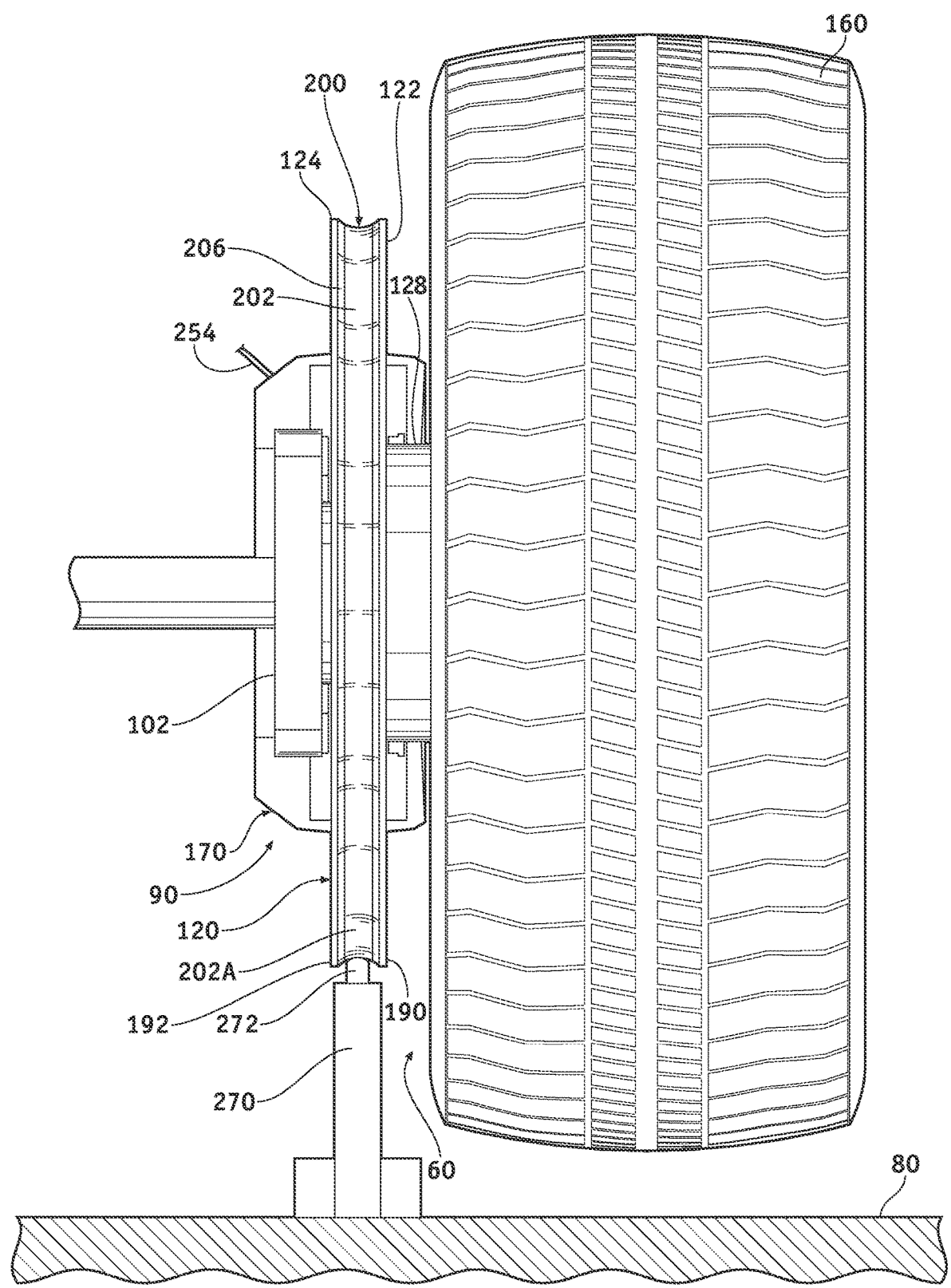
FIG. 12 is a front elevation view of the left rear wheel and disc brake assembly of the embodiment of FIG. 10 operating on a rail.

FIG. 12 illustrates brake disc 122 associated with left rear wheel 60 operating on rail 270A supporting wheel's 60 tire 160 above roadway surface 80. Rail 270A extends upright from roadway surface 80 to head 272 in direct contact against the overlying contact surface 202A of tread's 200 track 202 resting direction atop head 272. Inner and outer rail flanges 190 and 192 on either side of tread 200 serve to keep contact surface 202A registered on and in direct contact against rail's 270A head 272 when vehicle 50 is stationary on rail 270A and driving over rail 270A. Rail 270A is metal, electrically contacts tread's 200 track 202 when contact surface 202A rests directly atop rail's 270A head 272, and serves as a power source for charging traction batteries 84 of vehicle's 50 traction battery system 86. When energized from a suitable electrical power source, electricity transmits from rail's 270A head 272 to track 202, from track 202 to roller 230 and its attached shaft 232, to rotary bearing 244 from shaft 232, and to vehicle's 50 traction batteries 84 of the traction battery system 86 via vehicle's 50 electrical wiring 254 for charging traction batteries 84 when the vehicle 50 is stationary on rail's 270A head 272 and when the vehicle 50 is driving on rail's 270A head 272. Accordingly, when brake discs 122 of the vehicle 50 are mounted on and supported by heads 272 of rails 270A and 270B in FIGS. 10 and 11, rails 270A and 270B serve as a power source for charging traction batteries 84 of the vehicle's 50 traction battery system 86 through the respective brake disc assemblies 90 according to the discussion of the disc brake assembly 90 of left rear wheel 60.

Figure 13:
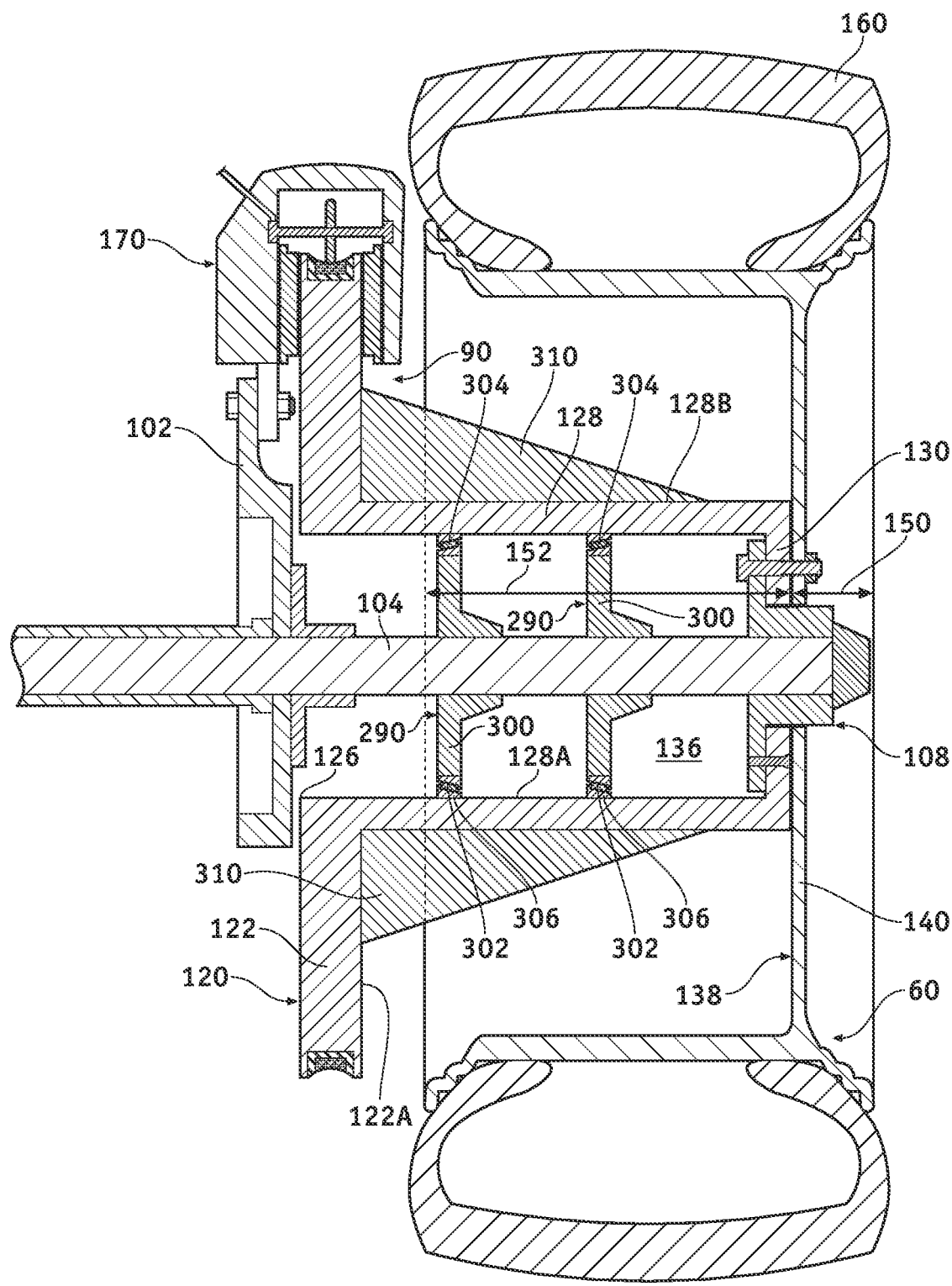
FIG. 13 is a section view like FIG. 2 illustrating an alternate embodiment of the invention.

FIG. 13 is view similar to FIG. 2 illustrating an alternate embodiment including left rear wheel 60, disc brake assembly 90 including brake caliper assembly 170, knuckle 102, hub 108, frame 138, tire 160, and their various appurtenances described above. In FIG. 13, wheel 60 is a standard offset wheel, having a shallow front space 150 from the outside edge of wheel 60 to its mounting face against the outer side of rotor flange 130, and a comparatively deep backspace 152 from the inside edge of wheel 60 to its mounting face against the outer side of rotor flange 130. Hat 128, the central section of brake rotor 120, extends axially outward from brake disc 122 to hat's 128 offset rotor flange 130 secured to hub 108. Hollow hat 128 defines volume 136 between its open end 126 and the assembly of hub 108, brake rotor's 120 rotor flange 130, and frame's 138 web 140, and axle 104 extends centrally through volume 136 to hub 108 from knuckle 102 and hat's 128 open end 126.

The length of hat 128 from its open end 126 to the assembly of hub 108, brake rotor's 120 rotor flange 130, and frame's 138 web 140 is longer than the length of hat 128 from its open end 126 to the assembly of hub 108, brake rotor's 120 rotor flange 130, and frame's 138 web 140 in the embodiment of FIG. 2 to accommodate the deep backspace 152. Radial rotary bearings 290 in volume 136 between open end 126 and the assembly of hub 108, brake rotor's 120 rotor flange 130, and frame's 138 web 140 and coupled between axle 104 and inner surface 128A of hat 128 support radial loads between axle 104 and inner surface 128A to reinforce brake rotor's 120 load-bearing property, its ability to support vehicle 50 when brake rotor 120 operates on a rail as described herein. Radial rotary bearings 290 are identical, of standard construction, highly generalized, and axially spaced apart along shaft 104 and hat 128. Each radial rotary bearing 290 includes an annular body 300 of steel, cast iron, or other hard, rigid metal. Each annular body 300 fixed to shaft 104 circumscribes and is press fit to shaft 104 and extends radially outwardly from shaft 104 to a peripheral race 302 and suitable bearings 304 captured between race 302 and an opposing race 306 affixed rigidly, such as by welding, to hat's 128 inner surface 128A. Radial rotary bearings 290 not only support radial loads between axle 104 and inner surface 128A of hat 128 for brake rotor 120 load-bearing purposes but also enable axle 104 and inner surface 128 to displace rotationally relative to one another as needed during the vehicle's 50 operation. Although the embodiment of FIG. 13 incorporates two axially spaced apart radial rotary bearings 290, it can have less or more as desired.

Figure 14:
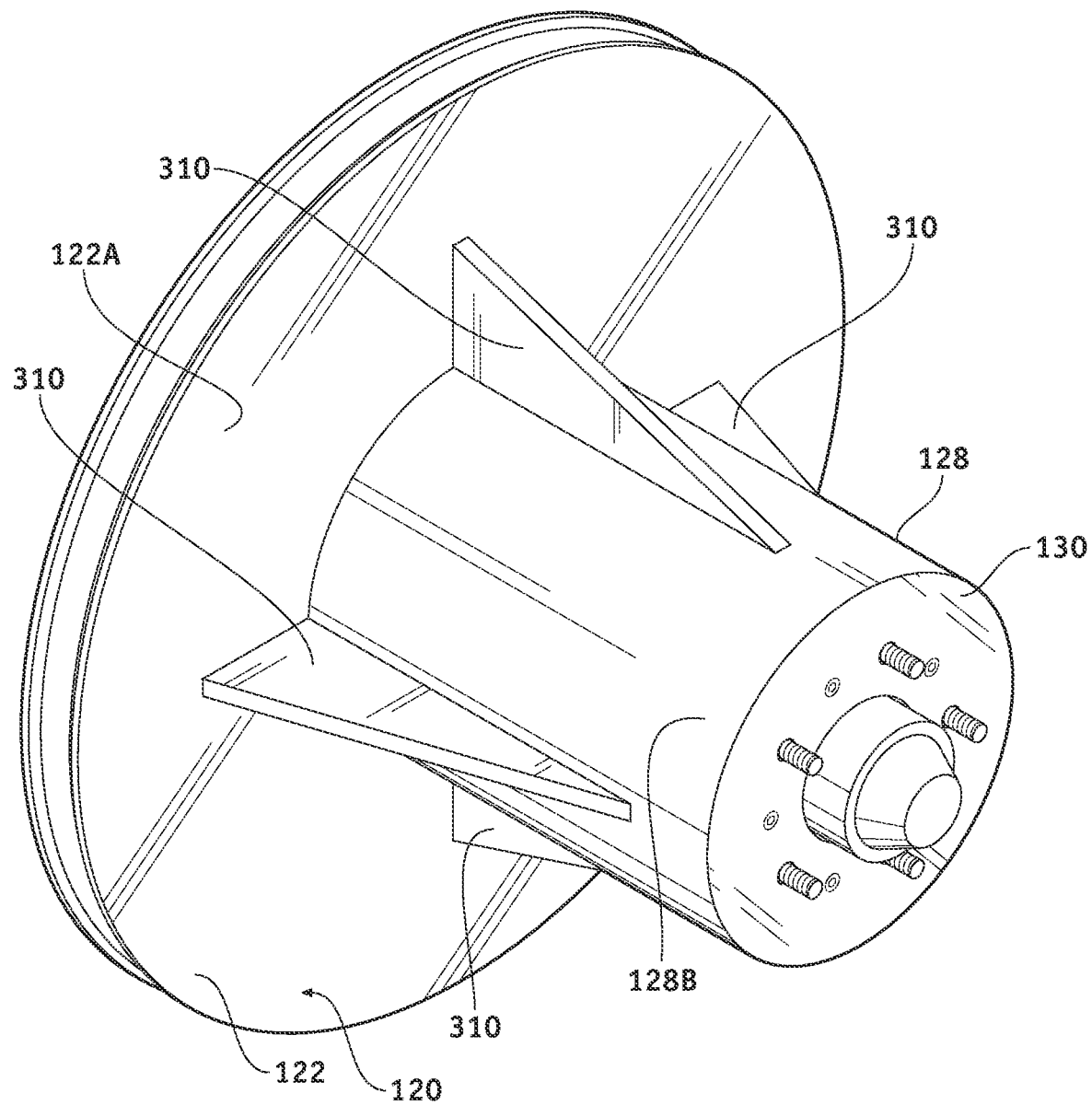
FIG. 14 is an outer side perspective view of a brake rotor of the embodiment of FIG. 14.

In FIGS. 13 and 14, circumferentially spaced apart gussets 310 coupled between hat's 128 outer surface 128B and brake disc's 122 outer braking surface 122B also serve to reinforce brake rotor's 120 load-bearing property, its ability to support vehicle 50 when brake rotor 120 operates on a rail as described herein. Gussets 310 are equally spaced apart circumferentially, are of the material as brake rotor 120, are rigidly affixed, such as by welding, to outer hat's 128 outer surface 128A and brake disc's 122 outer braking surface 122B, and do not interfere with disc brake assembly 90 or the operation of brake rotor 120 on a rail. While the embodiment of brake rotor 120 in FIGS. 13 and 14 has four gussets 310, it can have less or more in alternate embodiments. Other than the configuration of brake rotor's 120 hat 128, radial rotary bearings 290, and gussets 310, the configuration of the embodiment of FIG. 13 is identical in every respect to the embodiment of FIG. 2.

The person having ordinary skill in the art will readily appreciate that exemplary wheel and brake disc assemblies of a vehicle are disclosed. The various embodiments of the invention make efficient use of the vehicle's 50 brake discs 122 that are uniquely configured according to the invention to interface with the vehicle's 50 brake caliper assemblies 170, operate on rails without the need for separate auxiliary rail wheels, and interface between the rails and the vehicle's 50 electric power system to charge the vehicle's 50 traction battery system 86 traction batteries 84 when the brake discs 122 are operating on the rails and the rails are energized.

The present invention is described above according to illustrative embodiments. Those skilled in the art will recognize that changes and modifications may be made in the described embodiments without departing from the nature and scope of the present invention. For example, contact 220 electrically connecting track 202 to vehicle's 50 electric power system is roller 230 in constant rolling contact directly against track's 202 contact surface 202A. If desired, a non-rotating, spring-loaded finger or projection extending to a free extremity in constant sliding contact directly against track's 202 contact surface 202A from a stationary shaft or support supported by fixture 176 and electrically connected to the vehicle's 50 power system is useful in alternate embodiments. Further, when brake discs 122 of the vehicle 50 are mounted on and supported by heads 272 of rails 270A and 270B in FIGS. 10 and 11, tires 160 are elevated over roadway surface 80 and the brake rotors 120 support the vehicle's 50 weight. In an alternate embodiment, the height of rails 270A and 270B to their respective heads 272 from roadway surface 80 is sufficiently low to keep tires 160 in contact with roadway surface 80 when the vehicle's 50 brake discs 122 are on heads 272 of rails 270A and 270B, in which the vehicle's 50 wheels 60 and 62 at brake rotors 120 share the vehicle's 50 weight. This is useful at a charging station where vehicle 50 is stationary during charging and driving the vehicle 50 solely over the rails is not required.

Other changes and modifications to the embodiments herein chosen for purposes of illustration will readily occur to those skilled in the art. To the extent that such modifications and variations do not depart from the spirit of the invention, they are intended to be included within the scope thereof.

The invention claimed is:

1. A wheel and brake disc apparatus of a vehicle, comprising:
    a roadway wheel and a brake disc mounted rotatably to the vehicle, the roadway wheel and the brake disc arranged about an axis of rotation;
    the roadway wheel extending radially in relation to the axis of rotation to a wheel rim configured to hold a tire adapted to operate on a roadway surface;
    the brake disc extending radially in relation to the axis of rotation to a brake disc rim comprising a tread;
    the brake disc spaced inboard away from the roadway wheel, allowing the tread to operate on a rail without interference from the roadway wheel; and
    a brake caliper assembly mounted at a fixed location over the brake disc rim and configured to squeeze brake pads against the brake disc.

2. The wheel and brake disc apparatus according to claim 1, further comprising:
    a first radius extending from the axis of rotation to the wheel rim;
    a second radius extending from the axis of rotation to the brake disc rim; and
    the first radius greater than the second radius.

3. The wheel and brake disc apparatus according to claim 2, wherein the brake caliper assembly extends outward beyond the first radius from the brake disc rim.

4. The wheel and brake disc apparatus according to claim 3, further comprising:
    a knuckle mounted at a fixed position adjacent to the brake disc;
    the brake caliper assembly mounted to the knuckle; and
    the brake disc between the roadway wheel and the knuckle.

5. The wheel and brake disc apparatus according to claim 1, further comprising:
    the rail is electrically conductive; and
    the tread comprises an electrically conductive track configured to contact and electrically connect to the rail, including when the roadway wheel and the brake disc concurrently rotate about the axis of rotation.

6. The wheel and brake disc apparatus according to claim 5, the brake disc further comprising an insulator configured to electrically isolate the electrically conductive track from the brake disc.

7. The wheel and brake disc apparatus according to claim 6, the brake disc rim additionally comprising a flange on either side of the electrically conductive track.

8. The wheel and brake disc apparatus according to claim 5, further comprising a contact mounted at a fixed position, the contact electrically connected to an electric power system of the vehicle and in electrical contact against the electrically conductive track, including when the roadway wheel and the brake disc concurrently rotate about the axis of rotation.

9. The wheel and brake disc apparatus according to claim 8, wherein the vehicle is an electric or hybrid electric vehicle powered by chargeable batteries of a traction battery system, and the electric power system comprises the traction battery system.

10. The wheel and brake disc apparatus according to claim 8, wherein the contact is carried by the caliper assembly.

11. The wheel and brake disc apparatus according to claim 8, the contact comprising a roller configured to rotate against, and in response to rotation of, the brake disc.

12. The wheel and brake disc apparatus according to claim 11, wherein the roller is mounted rotatably to the brake caliper assembly.

13. A wheel and brake disc apparatus of a vehicle, comprising:
 a roadway wheel and a brake disc secured to a hub of an axle of the vehicle, the roadway wheel and the brake disc arranged about an axis of rotation of the hub;
 the roadway wheel extending radially in relation to the axis of rotation to a wheel rim configured to hold a tire adapted to operate on a roadway surface;
 the brake disc inboard of the roadway wheel and extending radially in relation to the axis of rotation to a disc rim from an open end of a hat extending outward from the brake disc to an assembly comprising an inwardly-directed flange secured to the hub, the hat defining a volume between the open end and the assembly, and the axle extending through the volume to the hub from the open end;
 a radial rotary bearing in the volume, the radial rotary bearing coupled between the axle and the hat and configured to support radial loads therebetween;
 a brake caliper assembly mounted at a fixed location over the brake disc rim and configured to squeeze brake pads against the brake disc; and
 the brake disc rim comprising a tread configured to operate on a rail without interference from the brake caliper assembly.

14. The wheel and brake disc apparatus according to claim 13, further comprising circumferentially spaced apart gussets coupled between the hat and the rotor.

15. The wheel and brake disc apparatus according to claim 13, further comprising:
 a first radius extending from the axis of rotation to the wheel rim;
 a second radius extending from the axis of rotation to the brake disc rim; and
 the first radius greater than the second radius.

16. The wheel and brake disc apparatus according to claim 15, wherein the brake caliper assembly extends outward beyond the first radius from the brake disc rim.

17. The wheel and brake disc apparatus according to claim 16, further comprising:
 a knuckle mounted at a fixed position adjacent to the brake disc; and
 the brake caliper assembly mounted to the knuckle.

18. The wheel and brake disc apparatus according to claim 13, further comprising:
 the rail is electrically conductive; and
 the tread comprises an electrically conductive track configured to contact and electrically connect to the rail, including when the roadway wheel, the brake disc, and the hub concurrently rotate about the axis of rotation.

19. The wheel and brake disc apparatus according to claim 18, the brake disc further comprising an insulator configured to electrically isolate the electrically conductive track from the brake disc.

20. The wheel and brake disc apparatus according to claim 19, the brake disc rim additionally comprising a flange on either side of the electrically conductive track.

21. The wheel and brake disc apparatus according to claim 18, further comprising a contact mounted at a fixed position, the contact electrically connected to an electric power system of the vehicle and in electrical contact against the electrically conductive track, including when the roadway wheel, the brake disc, and the hub concurrently rotate about the axis of rotation.

22. The wheel and brake disc apparatus according to claim 21, wherein the vehicle is an electric or hybrid electric vehicle powered by chargeable batteries of a traction battery system, and the electric power system comprises the traction battery system.

23. The wheel and brake disc apparatus according to claim 21, wherein the contact is carried by the caliper assembly.

24. The wheel and brake disc apparatus according to claim 21, the contact comprising a roller configured to rotate against, and in response to rotation of, the brake rotor assembly.

25. The wheel and brake disc apparatus according to claim 24, wherein the roller is mounted rotatably to the brake caliper assembly.

\* \* \* \* \*